PHASE DIAGRAM.
SYSTEM: PO–H₂O–SOD. FORMATE
AT 33°C

United States Patent Office 3,574,772
Patented Apr. 13, 1971

3,574,772
PREPARATION OF PURE MONO- AND DI-PROPYLENE GLYCOL BY PLURAL STAGE DISTILLATION WITH SIDE STREAM RECOVERY
Mitchell Becker, Teaneck, and Jack B. Feder, Dumont, N.J., assignors to Halcon International, Inc.
Filed Oct. 25, 1968, Ser. No. 770,568
Int. Cl. C07c 29/24
U.S. Cl. 260—637                6 Claims

ABSTRACT OF THE DISCLOSURE

This invention relates to a process for preparing propylene glycol which meets both U.S.P. and Food Grade standards. The process comprises treating a crude propylene oxide with an aqueous base, phase separating, hydrolyzing the separated propylene oxide fraction to form propylene glycol and passing said propylene glycol into a distillation zone, fractionally distilling the propylene glycol, separating pure mono propylene glycol as a liquid stream at an intermediate point in said zone from impurities which boil higher and lower than the propylene glycol.

---

Figure 1:
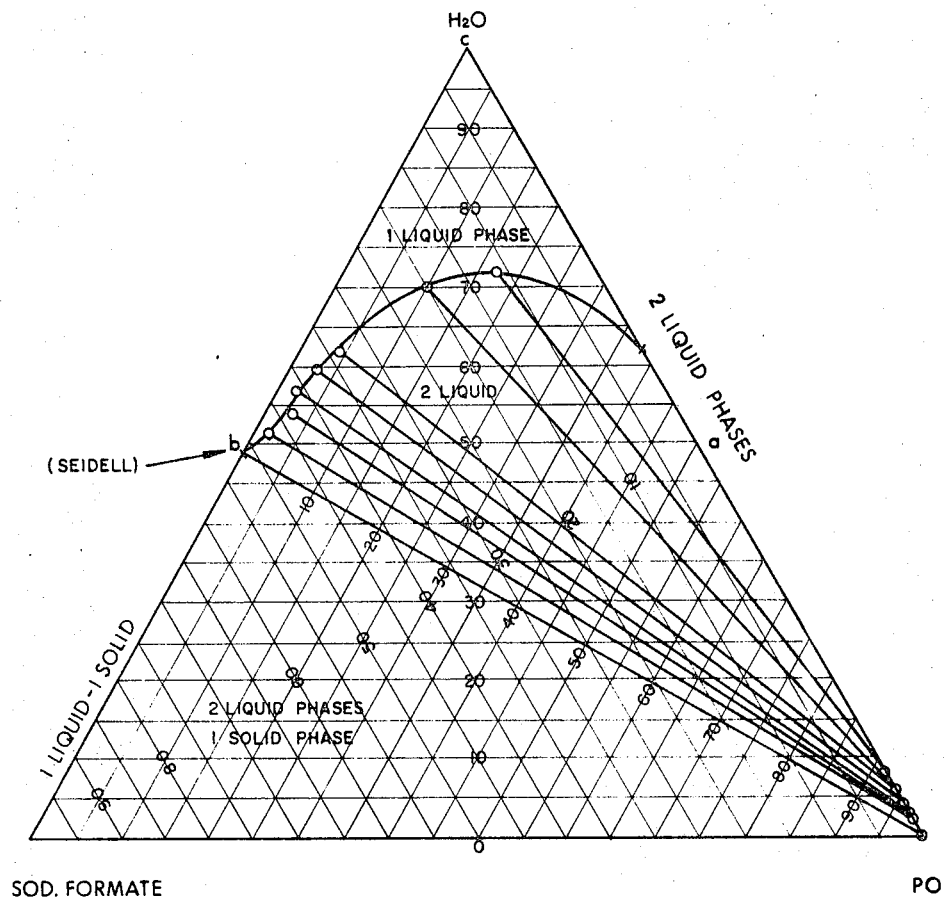

This invention relates to a process for preparing pure mono propylene glycol. More specifically, this invention relates to a process for preparing pure mono propylene glycol which meets both U.S.P. and Food Grade standards. In its more particular aspect, the invention relates to the aqueous basic treatment of a crude propylene oxide, hydrolysis of the separated propylene oxide fraction and distillations of the propylene glycols thus formed, first through a distilling column wherein excess hydrolysis water is removed overhead and then through a second column wherein the mono propylene glycol is removed as a liquid stream from an intermediate point of the distilling column. The impurities which boil lower than mono propylene glycol are removed together with a small portion of the mono propylene glycol at a point above that from which mono propylene glycol is removed, and compounds higher boiling than mono propylene are removed from the reboiler. (This type of separation is sometimes called "pasteurization." The invention also relates, as an additional feature, to the recovery of substantially pure di-propylene glycol which is produced as a by-product from the propylene oxide hydrolysis.

BACKGROUND OF THE INVENTION

The epoxidation of propylene to propylene oxide with organic hydroperoxides leads to by-product formation which includes methyl formate, formic acid, formaldehyde, acetaldehyde and various other by-products. Crude propylene oxide obtained from this source upon hydrolysis and distillation results in propylene glycol which contains contaminants, such as formate esters. In the prior art propylene oxide has been purified of these contaminants by treating a crude propylene oxide with an aqueous base and subsequently phase separating the oxide to obtain a substantially pure propylene oxide. In an attempt to obtain propylene glycol substantially free of formate esters and other impurities and to meet both Food Grade and U.S.P. standards for propylene glycol, it was considered that such a pure propylene glycol could be obtained by merely hydrolyzing a pure propylene oxide as prepared in the prior art. Therefore, propylene glycol was prepared by hydrolyzing the pure propylene oxide as prepared above. Although this propylene glycol so obtained is substantially free of formate esters as well as most other impurities, it nonetheless does not meet U.S.P. or Food Grade standards with regard to odor and/or taste. Therefore, it is apparent that although the art may have directed one to using a basic treated propylene oxide in order to obtain pure mono-propylene glycol, attempts at such preparation have been unsuccessful, with regard to ordor and/or taste.

It is an object of this invention, therefore, to provide a method for preparing pure mono-propylene glycol essentially free of formate esters as well as other impurities and which is also capable of meeting both U.S.P. and Food Grade standards, for both odor and taste.

I have surprisingly found that although propylene glycol meeting both U.S.P. and Food Grade standards cannot be prepared from a basic treated propylene oxide by hydrolyzing and distilling, said propylene glycol can be prepared by employing the additional feature of a "pasteurization" section in the distillation. The success of this technique is even more surprising when one considers that if a basic treatment is carried out on the hydrolyzed propylene oxide rather than the propylene oxide itself, the pasteurization step has little effect upon the quality of the propylene glycol and an excessive loss of di-propylene glycol also results. Therefore, my invention is directed to the unique combination of treating a crude propylene oxide with an aqueous base, separation of the so treated propylene oxide, hydrolysis of said oxide and distillation including a pasteurization. For the purposes of this invention, a pure mono-propylene glycol is one which meets both U.S.P. and Food Grade standards and, in addition, has little or no odor and/or taste not associated with mono-propylene glycol itself.

Figure 2:
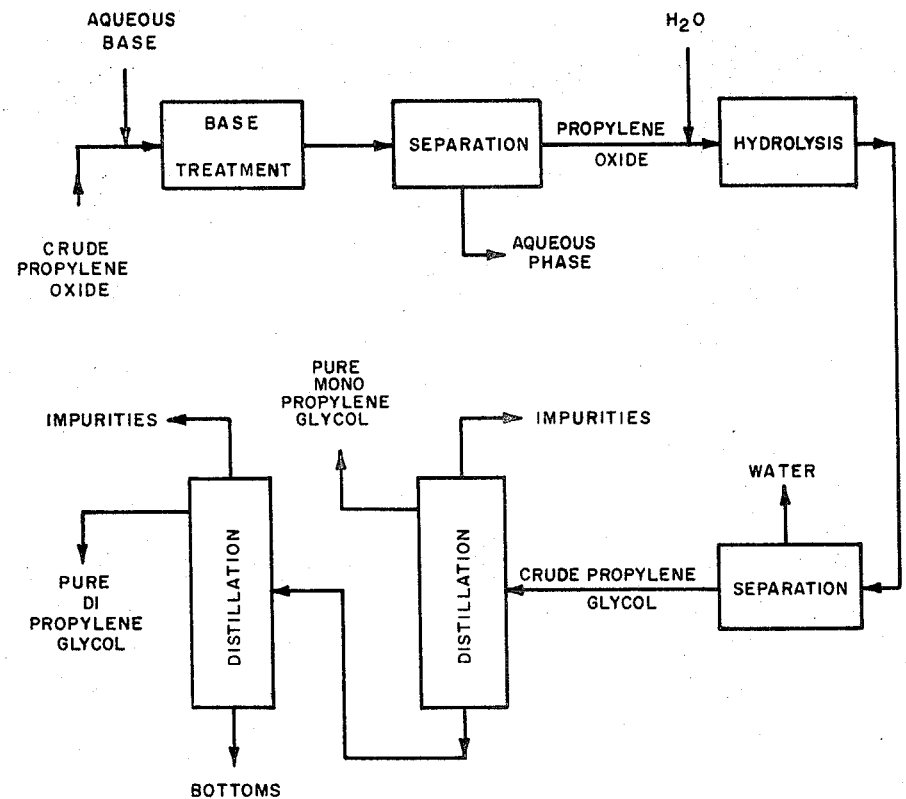

FIG. 1 is a phase diagram illustrating the amount of base used to treat the crude propyleneoxide while FIG. 2 is a schematic drawing illustrating the invention.

DETAILS OF THE INVENTION

The propylene oxide used in the process of this invention is prepared by the epoxidation of propylene in the presence of an organic hydroperoxide. This procedure for preparing propylene oxide is widely known in the art, and my invention contemplates the use of propylene oxide as prepared by this procedure and well-known variations. For example, the propylene oxide may suitably be prepared by the process as disclosed in U.S. Pat. 3,351,635 issued Nov. 7, 1967 and U.S. Pat. 3,350,422 issued Oct. 31, 1967.

In my invention, crude propylene oxide obtained as above noted is treated with an aqueous basic solution in order to remove substantially all of the methyl formate into the aqueous basic phase. The propylene oxide phase is separated and thermally hydrolyzed (altough a catalyst may be used, but is not preferred), and the aqueous glycol so obtained is purified by de-watering in a continuous distillation column, operated to remove water overhead and to provide a glycol feed to subsequent vacuum distillation columns, the first of which removes mono-propylene glycol and the second of which, operated at lower pressure, removes di-propylene glycol. In each of these latter two vacuum distillation columns, it is critical to employ a pasteurization section atop each column in order to obtain mono or di-propylene glycol, respectively, which meets both U.S.P. and Food Grade standards. If desired, the entire distillation may be carried out batchwise in one column. However, preferably, individual columns are used for each fraction. Suitably, one may use a continuous distillation. However, in such an event, at least two columns are employed, one to remove the mono-propylene glycol and the other to remove the di-propylene glycol.

Referring to FIG. 2, which schematically illustrates the invention, the crude propylene oxide is admixed with aqueous base and subjected to the base treatment. The resulting mixture is phase separated with the separation of an aqueous phase from the propylene oxide phase. As shown, the propylene oxide phase is admixed with water and subjected to a hydrolysis whereupon the propylene oxide is converted to propylene glycol. The mixture from the hydrolysis passes to the separation which appropriately is a continuous distillation in which the aqueous glycol is dewatered. The crude propylene glycol then passes to a first distillation column wherein pure mono propylene glycol is separated as an intermediate liquid stream from lower boiling impurities and from a higher boiling di-propylene glycol containing stream. The higher boiling stream is passed to a second distillation column wherein pure di-propylene glycol is separated as an intermediate liquid stream from lower and higher boiling materials.

In treating the crude propylene oxide, any suitable water soluble base may be used. The base is preferably added in an amount at least equal to the stoichiometric amount required to saponify the esters, and neutralize any acids present. Quantities in excess of this amount may be employed if desired. However, no more than a 10% excess is preferred. The type of base employed is not critical and suitably may be any water soluble inorganic or organic base such as alkali and alkali earth hydroxides, carbonates, bicarbonates and the like, lower aliphatic amines and derivatives thereof, aromatic amines and heterocyclic amines. Examples of such bases are sodium hydroxide, potassium carbonate, ammonium hydroxide, sodium bicarbonate, barium hydroxide, ethanolamine, butylamine, benzylamine, n-methylmorpholine and the like. In the more preferred aspect of this invention, the basic material is an inorganic base, especially an alkali base such as sodium hydroxide or potassium hydroxide. The amount of aqueous base to propylene glycol may be suitably expressed by reference to a phase diagram (see attached). All points on the phase diagram were determined experimentally except the point indicated on the diagram as "(Seidell)." This latter point was obtained from "Seidell A. Solubility of Inorganic and Metal Organic Compounds," fourth edition revised by W. F. Linke, Am. Chem. Soc., Washington, D.C. (1965) page 851. The amount of aqueous phase is such as to be within the two phase region of the ternary phase diagram for water-propylene oxide-sodium formate and resulting in an overall composition which lies on a tie line connecting the propylene oxide (PO) phase with an aqueous phase of low propylene oxide content. Such an overall composition is typically 93% propylene oxide, 5% water and 2% formate at a temperature of 33° C. (this point is marked + on the diagram).

The basic treatment may be carried out at any suitable combination of contact time, temperature and pressure which will effect saponification and/or neutralization. For example, the treatment may be carried out at contact times of from 2 minutes to 600 minutes and at temperatures of from 0° C. to about 150° C. and pressures such as to keep the mixture at or below its boil point. The propylene oxide is subsequently separated from the aqueous phase and hydrolyzed. Any well-known means for separating propylene oxide from the aqueous phase may be employed, such as, gravity decantation, centrifugal decantation and the like.

Any well-known means may be employed to hydrolyze the propylene oxide preferably non-catalytic. For example, the hydrolysis may be carried out at elevated temperatures and pressures such as to keep the mixture at or below its boil point at all times. Generally, the hydrolysis is carried out at temperatures of 50° C. to 275° C. but preferably from 140° C. to 205° C.

The hydrolysis product thus obtained is distilled to recover the desired pure propylene glycol. The distillation is suitably carried out by passing the hydrolysis product to a distillation column under either superatmospheric, atmospheric or reduced pressure, from which water and unreacted epoxide are removed; the bottoms of this distillation are passed to a vacuum distillation train whose first column removes the mono glycol overhead, and whose second column removes the di-propylene glycol overhead. The bottoms from this last column may be either recycled to the hydrolysis step and/or purged from the system. The temperatures and pressures of each of the distillation columns are not critical, and suitably any convenient temperature and pressure may be used which will allow for adequate separation. For example, in the distillation of the water a head pressure resulting in a reboiler temperature of from 60° C. to 275° C. may be used and preferably atmospheric pressure and reboiler temperatures of from 180° C. to 210° C. (the exact value depending on column pressure drop and on the ratio of mono to di-glycol from hydrolysis). The distillation column used for removing the mono-propylene glycol may suitably be operated at reboiler temperatures of 125° C. to 240° C. and 0.2 to 15 p.s.i.a., and preferably 180° C. to 210° C. and 1.7 to 5.8 p.s.i.a.; that for the di-glycol suitably at reboiler temperatures of 140° C. to 270° C. and head pressure of 0.2 to 15 p.s.i.a. and preferably 145° C. to 200° C. and 0.75 to 2.0 p.s.i.a. In each of the second and third distillation columns a pasteurization section is employed for removal of any light or heavy ends from both the propylene glycol and di-propylene glycol product. The pasteurization section referred to may be described as follows: an added distillation zone placed atop the normal overheads takeoff point for the purpose of providing a means for removing most of any lighter boiling impurities in the normal overheads (though not all, since the low boilers must of necessity pass by the normal take off point to reach this added distillation zone). As a consequence of this addition, the product takeoff from the "normal" takeoff point may now be either as a vapor or, by appropriate design modification (chimney tray, liquid seal) as a liquid. The vapors leaving the top of the added distillation zone (pasteurization section) are normally condensed and returned to the top of the pasteurizing section, excepting for a small amount withdrawn as purge of low boiling impurities. The concentration of low boiling impurities in the purged liquid is generally quite low; the material consists largely of the product component. Thus, it can be seen that the purpose of a pasteurization section is to economically effect in a single distillation apparatus what would normally require two such units, namely separation of both lights and heavies from a given feedstock. Abnormally, such as when lights are formed within the distillation apparatus, as by decomposition or reaction of feedstock constituents, pasteurization affords an economic means to effect separation of lights from the feedstock. (This last is true both for batch and continuous distillation. In the present case of separation of mono-propylene glycol from di-propylene glycol, it has been found that lights are indeed formed within the distillation apparatus. Thus, when an *odorless* mixture of mono- and di-propylene glycol (85/15 by weight) was fed at 1000 ml./hr. to a 2" diameter Oldershaw column system consisting of 15 stripping plates, 10 rectification plates, liquid product withdrawal head and 5 pasteurizing plates operated at 250 mm. Hg, 2.5/82.5/15 by weight pasteurization overhead purge/product/bottoms and 1/1 pasteurization section reflux/product withdrawal it was found that the pasteurization section overheads purge had considerable odor while the product stream was essentially odorless. This is indicative of formation of low boiling odorous material during the course of distillation. This is further confirmed by Example 3, wherein it is seen that the odorous material apparently appears in the mono-propylene glycol heart cut of batch distillation, not having been removable as a forecut. The pasteurization section may contain as few as one to as many as 50 plates, but preferably contains from 3 to 10 plates.

EXAMPLE 1

Propylene oxide

There is charged to a pressure reactor equipped with an agitator 10 gms. of cumene hydroperoxide, 10 gms. of acetone, 0.5 gms. of vanadium naphenate which contains 3.4% by weight vanadium and 31.1 gms. of propylene. The reaction mixture is heated to 40° C., and reacted with agitation for 16 hours at a pressure of about 150 p.s.i.g. The reaction mixture is subjected to a distillation to separate the product propylene oxide from the remaining components of the reaction mixture.

EXAMPLE 2

Commercial propylene oxide was "doped" with impurities such as to give 95.37% pure propylene oxide. The impurities added included methanol (0.38%), methyl acetate (0.02%), acetaldehyde (0.25%), acetone (0.15%), propionaldehyde (0.15%), various hydrocarbons—for the most part $C_6$'s (in aggregate totaling 2.17%)—and methyl formate (1.48%). The impure propylene oxide was hydrolyzed using 2.36 wts. of water per wt. of impure propylene oxide. On heatup, the temperature rose to a peak of 203° C. and the pressure rose to 300 p.s.i.g., being held to this rise by means of a cooling coil within the batch hydrolysis vessel. The run was terminated after 12 minutes by cooling the batch rapidly to room temperature.

A portion of the above described hydrolyzate was treated with 50% aqueous potassium hydroxide in amount such as to be sufficient for neutralization of 90% of the stoichiometric quantity of acid and ester analytically determined (71 milliequivalents per kilogram). Treatment was at 160° C. under its own vapor pressure (sealed autoclave) for 5 minutes. The treated aqueous glycol was then fed through a continuous water stripper consisting of 15 actual plates above the feed inlet and 15 actual plates below. 2" diameter vacuum jacketed Oldershaw columns were used along with a glass draft-tube reboiler of about 180 ml. capacity and also a magnetic reflux head. Operation was at atmospheric pressure. The aqueous propylene glycol, at about 120° C., was fed at the rate of approximately 900 ml./hr. and approximately 600 ml./hr. of water was taken overhead at a reflux ratio ($L/D$) of 1/5. Reboiler temperature was 192° C.

The dewatered gylcols from the bottom of the column operation just described were fed to a continuous mono propylene glycol recovery column. This column consisted of a glass draft-tube reboiler (electric cartridge heated) containing about 500 ml. of liquid, a 15-plate stripping section above the reboiler, a feed inlet section, a 10-plate rectifying section above the feed inlet, a liquid draw-off section above the rectifying section, and a 5-plate pasteurization section above the liquid draw-off section. Above the pasteurization section was another inlet section and above this was a vapor line leading to a total condenser. The condensate from the total condenser was led through a rotameter for flow rate determination and then back into an inlet at the top of the pasteurization section. A small purge stream could be withdrawn from this reflux line. The liquid product drawoff section below the pasteurization section was led through a product rotameter, in order that the withdrawal rate of mono propylene glycol could be controlled using a valve in this line, and into an evacuated receiver equilized into the vacuum system. The column was operated at a pressure of 250 mm. Hg and the ratio of liquid return to the top of the pasteurization section to product withdrawal was maintained at approximately 1.2 by adjustment of the reboiler heat input. Reboiler temperature during operation was 200° C. Product tray temperature was 156–157° C. Overhead from the pasteurization section was 154° C. A purge amounting to approximately 2% of the take-off rate from the product tray was removed from the pasteurization condensate stream. 2" diameter vacuum-jacketed Oldershaw columns were used to supply the plateage. Feed rate to this system was at approximately 800 ml./hr. Overhead mono propylene glycol product was withdrawn at a rate of approximately 85% of the feed rate so as to satisfy material balance requirements. Bottoms were continually withdrawn through a U-tube seal into a receiver which was equalized into the vacuum system.

It was found that the mono propylene glycol product obtained from operation of the above distillation system had strong and objectionable odor.

A portion of the bottoms obtained from the operation of the continuous mono propylene glycol column just described were subjected to batch vacuum distillation for recovery of di-propylene glycol. A 20-plate 1" diameter vacuum-jacketed Oldershaw column was used as was a magnetic reflux splitter atop it and a condenser atop the reflux splitter. Operating pressure was 100 mm. Hg. Residual mono propylene glycol was first removed at a reflux ratio of 15/1 after which di-propylene glycol was collected at reflux ratio of 5/1. Although as much as 60% of the charge to this batch distillation was taken overhead, the overhead temperature never reached the vapor temperature of di-propylene glycol, indicating that decomposition was occurring. Finally, after about 60% of the charge was distilled, the overhead temperature dropped suddenly from 161° C. to 155° C. and the overhead condensate acquired a distinct yellow color thereby providing further proof of decomposition within the distillation apparatus.

It is apparent that the neutralization of hydrolyzate has led to a decomposition during di-propylene glycol recovery by the techniques employed in these examples. It is further evident that odorless mono-propylene glycol capable of meeting U.S.P. or Food Grade specifications is not produced from batch distillation without pasteurization even though the neutralization step has been omitted.

EXAMPLE 3

A second portion of the hydrolyzate of Example 2 was subjected to batch distillations to first dewater (15-plate 2 inch diameter vacuum-jacked Oldershaw, surmounted by a reflux splitter and condenser, operated at atmospheric pressure and 3/1 reflux ratio) and then to obtain mono propylene glycol and di-propylene glycol. The distillation of mono propylene glycol was conducted in this same equipment at an operating pressure of 285 mm. Hg and a reflux ratio of 5/1. No pasteurizing section was used. The mono propylene glycol heart cut recovered overhead had sufficient odor as to be deemed unacceptable as U.S.P. or Food Grade material.

The di-propylene glycol distillation was conducted using a 15-plate, 1 inch diameter, vacuum-jacketed Oldershaw column also surmounted by a magnetic reflux splitter and condenser. Operation was at 100 mm. Hg and 15/1 reflux ratio. 80% of the charge to this di-glycol distillation was taken overhead at a head temperature corresponding to that of di-propylene glycol. No decomposition was noted during this di-propylene glycol recovery procedure.

EXAMPLE 4

Commercial propylene oxide was "doped" with impurities described in Example 2 to the levels described in Example 2 and was thereafter contacted with 5.10 pts. of 23.2% NaOH solution (aqueous) per 100 lbs. of impure propylene oxide. The wash was given in a 30 gallon, type 316 stainless steel agitated vessel. Agitation was for 20 minutes at 33° C., after which agitation was stopped, the mixture settled and the phases separated. A portion of resulting propylene oxide was recharged to the 30 gallon reactor with water for hydrolysis in an amount equal to that used in Example 2 and a batch hydrolysis (thermal) was run at 160° C. The aqueous glycols resulting from said hydrolysis was continuously dewatered using a 3" diameter Oldershaw column having 10 plates in the rectification section, 20 plates in the stripping section and a 600 ml. draft tube thermosiphon reboiler (1.2 kilowatt cartridge) and topped by a reflux splitter and condenser. Operation of this dewatering section was at the same conditions as was used for Example 2, excepting that the feed rate was about 2200 ml./hr. with corresponding increase in overheads and bottoms rates.

The dewatered glycols obtained as bottoms from the dewatering column were fed to the continuous mono glycol column with pasteurizing section described in Example 2. Operating conditions, too, were the same as those of Example 2. Odorless mono propylene glycol was obtained from the product drawoff point during this distillation. As in Example 2, the pasteurization section purge produced material of high odor. The mono glycol product obtained from the product withdrawal section was found to be of satisfactory specification in all tests given and, in particular, was of satisfactory odor and taste. A table of these tests follows:

TABLE 1

|  | PG from caustic washed impure PO | Food grade specifications | U.S.P. typical sales specifications |
| --- | --- | --- | --- |
| Acidity, wt. percent [1] | 0.002 | 0.012 max | 0.003 max. |
| Water, wt. percent | 0.03 | 0.2 max | 0.2 mx. |
| DiPG, wt. percent | 0.05 |  |  |
| Ash, wt. percent | 0.001 | 0.7 max | 0.005 max. |
| Color, Pt-Co |  | 5 | Clear and colorless. | 10 max. |

[1] As HOAC.

The bottoms from the mono glycol column were used as feed to continuous dipropylene glycol distillation column. The column consisted of a glass draft-tube reboiler (electric cartridge heated) containing about 180 ml. of liquid, a 20-plate stripping section above the reboiler, a feed inlet section, a 15-plate rectifying section above the feed inlet, a liquid drawoff section above the rectifying section, and a 10-plate pasteurization section above the liquid drawoff section. Above the pasteurization section was another inlet section and above this was a vapor line leading to a total condenser. The condensate from the total condenser was led through a rotameter for flow rate determination and back into an inlet at the top of the pasteurization section. A small purge stream could be withdrawn from this reflux line. The liquid product drawoff section below the pasteurization section was led through a product rotameter, in order that the withdrawal rate of mono propylene glycol could be controlled using a valve in this line, and into an evacuated receiver equalized into the vacuum system. The column was operated at a pressure of 90 mm. Hg and the ratio of liquid return to the top of the pasteurization section to liquid product drawoff (from the product tray just below the pasteurization section) was maintained at approximately 1.7 by adjustment of reboiler heat input. Reboiler temperature during operation was 185–189° C. Feed rate was approximately 100 ml./hr., purge rate from the pasteurization section reflux line approximately 4 ml./hr., with 70 ml./hr. as liquid product takeoff rate. Colorless di-propylene glycol (approximately 10 APHA) but having some slight odor, was recovered from the product take off point of this column. The purge taken from the pasteurizing section overhead was found to be colorless but of high odor. No decomposition was apparent throughout this distillation as determined by distillate temperature.

Similarly, when the product from Example 1 (propylene oxide) is used in place of the propylene oxide in Examples 2 and 4, similar results are obtained.

Similarly, when an equivalent amount of ammonium hydroxide, sodium carbonate, barium hydroxide, butylamine, ethanolamine, benzylamine or n-methylmorpholine is used in place of potassium hydroxide and sodium hydroxide in Examples 2 and 4 respectively, similar results are obtained.

What is claimed is:

1. A process for preparing pure mono- and di-propylene glycol from crude propylene oxide derived from the epoxidation of propylene; which comprises the steps of:
   (a) treating said crude propylene oxide with an aqueous base at 0 to 150° C. to form a propylene oxide-aqueous base mixture;
   (b) separating propylene oxide from said propylene oxide-aqueous base mixture;
   (c) hydrolyzing said separated propylene oxide at 50 to 275° C. to form an aqueous propylene glycol solution;
   (d) separating water by distillation from said aqueous propylene glycol solution to form a crude propylene glycol;
   (e) passing said crude propylene glycol into a distillation zone, fractionally distilling the propylene glycol, separating pure mono propylene glycol as a liquid stream at an intermediate point in said zone from impurities which boil higher and lower than the mono propylene glycol; to form pure mono propylene glycol; and
   (f) passing the high boiling fraction obtained in step (e) into a distillation zone, fractionally distilling to separate pure di-propylene glycol as a liquid stream.

2. The process of claim 1 wherein in step (a) the aqueous base is an alkali or alkali earth hydroxide, carbonate, bi-carbonate, lower aliphatic amine, aromatic amine or heterocyclic amine.

3. The process of claim 2 wherein the aqueous base is an alkali or alkaline earth hydroxide, carbonate or bi-carbonate.

4. A process for preparing pure mono propylene glycol from crude propylene oxide derived from the epoxidation of propylene; which comprises the steps of:
   (a) treating said crude propylene oxide with an aqueous base at 0 to 150° C. to form a propylene oxide-aqueous base mixture;
   (b) separating propylene oxide from said propylene oxide-aqueous base mixture;
   (c) hydrolyzing said separated propylene oxide at 50 to 275° C. to form an aqueous propylene glycol solution;
   (d) separating water by distillation from said aqueous propylene glycol solution to form a crude propylene glycol; and
   (e) passing said crude propylene glycol into a distillation zone, fractionally distilling the propylene glycol, separating pure mono-propylene glycol as a liquid stream at an intermediate point in said zone from impurities which boil higher and lower than the mono-propylene glycol; to form pure monopropylene glycol.

5. The process of claim 4 wherein in step (a) the aqueous base is an alkali or alkali earth hydroxide, carbonate, bi-carbonate, lower aliphatic amine, aromatic amine or heterocyclic amine.

6. The process of claim 5 wherein the aqueous base is an alkali or alkaline earth hydroxide, carbonate or bi-carbonate.

References Cited

UNITED STATES PATENTS

| 2,550,847 | 5/1951 | Mitchell et al. | 260—348 |
| 2,618,590 | 11/1952 | Unger et al. | 203—98 |
| 2,622,060 | 12/1952 | Robeson et al. | 203—37 |
| 2,640,017 | 5/1953 | Graff | 203—99 |
| 3,350,415 | 10/1967 | Binning | 260—637 |
| 3,406,100 | 10/1968 | Karafian | 203—99 |

OTHER REFERENCES

Robinson et al.: The Elements of Fractional Distillation, 3rd edition, New York, 1939.

WILBUR L. BASCOMB, JR., Primary Examiner

U.S. Cl. X.R.

203—18, 73, 99; 260—348.5, 615